UNITED STATES PATENT OFFICE.

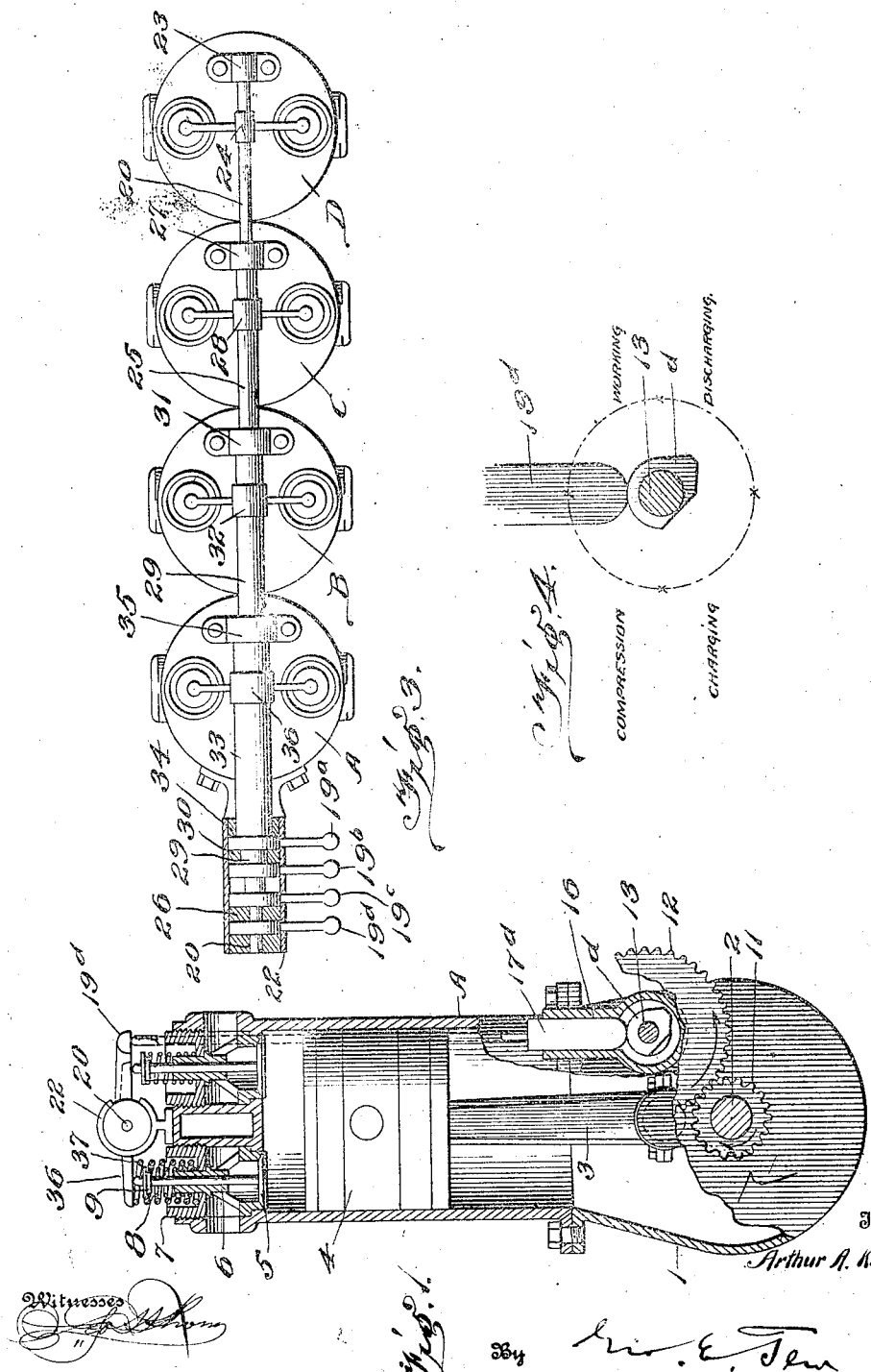

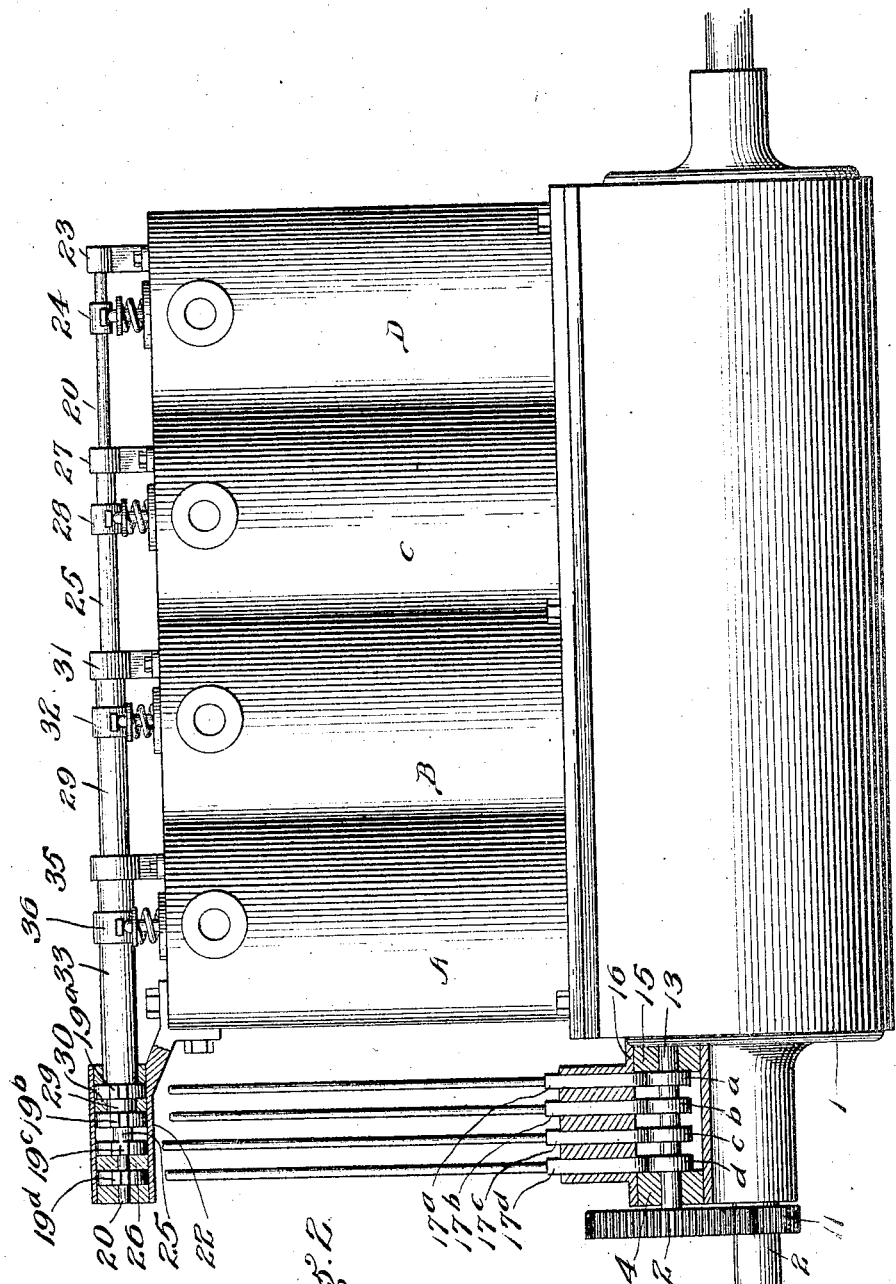

ARTHUR A. KARCHER, OF DETROIT, MICHIGAN.

VALVE-GEAR FOR EXPLOSIVE-ENGINES.

938,386.

Specification of Letters Patent. Patented Oct. 26, 1909.

Application filed March 5, 1909. Serial No. 481,494.

*To all whom it may concern:*

Be it known that I, ARTHUR A. KARCHER, citizen of the United States, residing at Detroit, in the county of Wayne and State of Michigan, have invented certain new and useful Improvements in Valve-Gear for Explosive-Engines, of which the following is a specification.

This invention relates to valve gears for internal combustion engines. Its object is to produce a valve mechanism free from the long cam shaft and its objectionable features and complications, and one quiet in operation and commercially cheap, to build. I attain these objects by the mechanism hereinafter described and illustrated in the accompanying drawings.

The gear is shown adapted to a four cylinder four cycle engine, but it is to be understood that it is not confined to this precise number of cylinders, for this mechanism may be used on any number of cylinders.

In the drawings, Figure 1 is an end view with a partial sectional view of a cylinder and the crank case. Fig. 2 is a side elevation, partly in section. Fig. 3 is a top view, partly in section. Fig. 4 is a detail in section of the cam shaft, with the cycle in diagram.

Referring specifically to the drawings, 1 is the crank case to which is attached cylinders A, B, C and D.

2 is a four throw crank shaft of the usual pattern, which rotates in suitable bearings in crank case 1, to which shaft the pistons 4 are connected by rods 3.

The inlet and exhaust valves are mounted in the head of each cylinder, and a description of one will answer for all.
5 is the exhaust valve which is located in a cage 6 which is held in place in the head of the cylinder by a cast nut 7. Spring 8 acts to hold valve 5 to its seat. One end of this spring rests on nut 7 the other end against valve cap 9 which is fixed to the stem of the valve 5. The intake valve and parts 10 are the same as the exhaust valve and parts and hence the description of one will suffice for both.
Gear 11 is attached and rotates with crank shaft 2 and meshes with gear 12 which has twice as many teeth as gear 11 and consequently rotates only one-half as fast, or one revolution for two of the crank shaft. The gear 12 is fast on the short cam shaft 13 which has four cams $d$, $c$, $b$ and $a$, which rotate in suitable bearings 14 and 15 supported by the housing 16, which housing also acts as a guide and support for the four valve lifters $17^d$, $17^c$, $17^b$ and $17^a$, which correspond to the cylinders, the valves of which they actuate, and the respective cams. To the upper end of the lifters are attached one end of each of the four valve rods and the other end is connected to the corresponding one of the four respective rock arms $19^d$, $19^c$, $19^b$ and $19^a$. Rock arm $19^d$ is securely attached to rock shaft 20 one end of which is supported by bearing 21 which in turn is supported by housing 22 which is bolted to cylinder A. The other end of rock shaft 20 is supported by bearing 23 which is attached to the head of cylinder D. To the rock shaft 20 is attached a double rock arm 24, one end of which actuates the exhaust valve, the other end of which actuates the intake valve. Rock arm $19^c$ is attached to rock shaft 25 one end of which is supported by bearing 26 which in turn is supported also by the housing 22, and the other end is supported by bearing 27 which is mounted on cylinder C. To rock shaft 25 is attached the double rock arm 28, one end of which actuates the exhaust valve and the other end actuates the intake valve. The rock shaft 25 is tubular so as to allow rock shaft 20 to pass freely through its center.

Rock arm $19^b$ is fixed to one end of rock shaft 29 one end of which is supported by bearing 30 which in turn is also supported by housing 22. The other end of rock shaft 29 is supported by bearing 31 which is attached to cylinder B. To rock shaft 29 is attached the double rock arm 32 one end of which actuates exhaust valve, and the other end the intake valve. This shaft is also tubular, so as to allow rock shafts 25 and 20 to extend freely through its center.

Rock arm $19^a$ on one end of rock shaft 33, is supported by the bearing 34 in the housing 22 and by bearing 35 which is attached to cylinder A, and this rock shaft has the double rock arm 36 to actuate the exhaust and intake valves. This rock shaft 33 is also tubular so as to allow rock shaft 29 to pass freely through its center. In short, the various shafts are telescoped.

There are two springs on each exhaust valve,—spring 8 and spring 37. The functions of exhaust spring 8 have already been explained. Spring 37 acts independently of exhaust spring 8, inasmuch as one end rests on nut 7 and the other end bears against the end of the double rock arm. This spring is much heavier than the intake springs 38 and consequently holds each of the four valve lifters 17$^d$, 17$^c$, 17$^b$ and 17$^a$, in close apposition with the four respective cams. As the cams rotate when that depressed portion of the cam marked "Charging stroke" arrives at the valve lifters it allows the lifters to be forced down by the spring 37 which being of sufficient strength compresses the springs 38 and opens the intake valves.

The four cycles of operation of cylinder A (for example) are as follows: Referring to Fig. 1, the motor is shown to rotate the crank shaft to the right, as indicated by arrow on gear 11, cam shaft rotating to left as indicated by arrow on gear 12, and the engine is just starting on working stroke. The strokes are indicated diagrammatically on Fig. 4. The crank shaft will make one cycle or one-half revolution on working or combustion stroke, bringing the raised part of cam around to valve lifter. On the return cycle, or one-half revolution the raised part of the cam will pass the valve lifter causing the same to rise, thereby lifting rock arm 19$^a$, forcing down end of double rock arm 36 and opening exhaust valve. When this stroke or cycle is completed, the crank R is at its highest point or center, and that portion of the cam at the beginning of the charging stroke is in apposition with the valve lifter. On the downward or charging stroke or cycle, that portion of the cam, indicated as the "Charging stroke" will pass the valve lifter, allowing spring 37 to force valve lifter down into flat portion of cam which will cause the double rock arm 36 to force intake valve open, allowing piston to draw in its charge. At the completion of this stroke or cycle the piston is at its lowest point or center and that portion of the cam at the beginning of the compression stroke is in apposition with the valve lifter, both valves being closed. On the return compression stroke or cycle that portion of the cam marked "Compression stroke" passes the valve lifter, but as that portion is a true circle the position of the valve lifter is not changed, and consequently both valves remain closed allowing the charge to be compressed. At the completion of this stroke or cycle the piston is at its highest point or center, with a charge in the cylinder compressed, and ready to be fired. Or at the point of starting, at the beginning of another working stroke.

The construction described allows the use of a very short cam shaft, and telescoping shafts across the cylinder heads, and the management of double arms and springs allows both sets of valves to be operated by one set of shafts and a single cam shaft.

The whole mechanism is compact and simple, and convenient for repair, adjustment and manipulation.

I claim:

1. The combination with a plurality of parallel cylinders having normally closed inlet and exhaust valves located beside each other in the head of each cylinder, a set of telescoped rock shafts of different lengths extending transversely across the cylinder heads and each having arms projecting oppositely and bearing on the stems of the respective valves of each cylinder, to open the same when the shaft is rocked, a spring operatively connected to each shaft to rock the same in one direction, and a cam operatively connected to each shaft and acting in opposition to the spring to rock the shaft in the other direction.

2. The combination of a plurality of parallel cylinders each having adjacent normally closed inlet and exhaust valves, a set of telescoped rock shafts extending across the cylinders and between the valve stems, each shaft having oppositely extending arms bearing on said stems to open either valve when the shaft is rocked one way or the other, a spring operatively connected to one of the said arms and tending to rock its shaft one way, a cam shaft having a cam for each rock shaft, and a follower for each cam, connected to one of the rock shafts, the cams having elevations acting to rock the shafts against the pressure of said springs and thereby open one valve of the cylinders, and depressions allowing the springs to rock the shafts the other way and thereby open the other valves.

In testimony whereof, I affix my signature in presence of two witnesses.

ARTHUR A. KARCHER.

Witnesses:
CHARLES R. FLANIGAN,
TIMOTHY H. HANLEY.